UNITED STATES PATENT OFFICE.

FLOYD J. METZGER, OF NEW YORK, N. Y., ASSIGNOR TO AIR REDUCTION COMPANY, OF NEW YORK, N. Y., A CORPORATION OF NEW YORK.

METHOD OF SEPARATING ALKALI CYANID FROM ALKALI CARBONATE.

1,337,019.          Specification of Letters Patent.      Patented Apr. 13, 1920.

No Drawing.      Application filed July 25, 1917. Serial No. 182,642.

*To all whom it may concern:*

Be it known that I, FLOYD J. METZGER, a citizen of the United States, residing in New York, county of New York, State of New York, have invented certain new and useful Improvements in Methods of Separating Alkali Cyanid from Alkali Carbonate, of which the following is a specification.

One well known process employed in the manufacture of alkali cyanid comprises as steps therein, the bringing together of carbon, in some form, an alkali carbonate and nitrogen in a suitable reaction chamber and heating the same to a temperature sufficient to cause combination between portions of the alkali, carbon and nitrogen to form an alkali cyanid. The product resulting from such treatment comprises a mixture of the alkali cyanid thus formed, carbonate and unacted upon or unchanged portions of the charge.

In order to secure the cyanid in commercial form it is necessary to separate the same from the other constituents of the mixture discharged from the furnace. Heretofore this has been accomplished by treatment of the mixture with water; but the results of such treatment have not been satisfactory because when sufficient water has been employed to dissolve only the cyanid the mass has been pasty, and has not been filterable, while the addition of an amount of water sufficient to convert the mass into a filterable state has resulted in dissolving a considerable portion of the alkali carbonate. This has caused the final cyanid product to contain an undesirable high proportion of the alkali carbonate.

I have discovered that by treating the mixture as it is discharged from the furnace as above described, with a "treating solution"; that is to say, a dissolving agent or medium consisting of water to which has been added an organic solvent soluble therein, I am enabled to obtain the desired product, alkali cyanid, in a much purer state than heretofore has been commercially practicable, as far as I am aware.

The organic solvent may consist of an organic liquid miscible with water. As examples of such a solvent I may mention ethyl alcohol, methyl alcohol, denatured alcohol, acetone and other like solvents. When this "treating solution", that is to say, this dissolving agent or medium consisting of water to which has been added an organic solvent, as described, is employed for treating the furnaced products it will be found that the alkali cyanid, as for instance sodium cyanid, is freely soluble in such mixture while sodium carbonate is relatively insoluble in the same medium.

The quantity of water which is mixed with the organic solvent should be varied in accordance with or in proportion to the relative proportions of the alkali cyanid and alkali carbonate which may be contained in the furnaced product. The proportion of water which should be employed in making up the dissolving agent or medium should also be varied in accordance with the nature of the organic solvent employed. If acetone should be employed a proportion of 10 to 20 parts of acetone to 90 to 80 parts respectively of water will produce a solvent which will give satisfactory results when employed in the treatment of the furnaced products of the character above stated. If denatured alcohol be used the proportions may vary from 20 to 60 parts more or less of alcohol to 80 to 40 parts, more or less, of water.

Obviously the quantity of solution of water and organic solvent which should be employed will depend upon the relative proportions of cyanid and carbonate in the furnaced product to be treated thereby.

I have further found that the degree of solubility of the alkali carbonate, as sodium carbonate, in this "treating solution" depends upon whether the said carbonate exists in the anhydrous, mono-hydrate or decahydrate form. When the carbonate is in the decahydrate form it is comparatively insoluble in the "treating solution" of the character above suggested; whereas the anhydrous carbonate tends to form supersaturated solutions, which return to a state of equilibrium only after the lapse of a considerable period of time. In so doing water is removed from the "treating solution" thereby disturbing the relative proportions of water and organic solvent in such treating solution.

In view of the fact that the furnaced product, having been subjected to high temperatures, contains the carbonate in anhydrous form it is desirable to first convert the latter into the decahydrate form. This is accomplished by first adding to the furnaced product an amount of water calculated to produce the desired decahydrate and thereafter subjecting the mass or mixture to the "treating solution."

A further advantage resulting from the use of the "treating solution" lies in the fact that alkali cyanid is not perceptibly decomposed by hydrolysis in such solution whereas hydrolytic decomposition is very rapid when water alone is used in the usual way as the extracting medium.

An even more efficient separation is obtainable by carrying out the extraction below the room temperature.

Practically the method as described may be carried out substantially as follows: The furnaced product should be analyzed to determine the relative proportions of cyanid and carbonate of which it is composed. Preferably this product should then be treated with an amount of water sufficient to convert the anhydrous alkali carbonate to the decahydrate form. This treatment should be carried out in a way such as not to allow the temperature to rise to the point at which decomposition of the cyanid sets in. When the reaction is complete and the temperature has returned to normal; that is to say, to room temperature, the mass is treated in a suitable agitator with approximately an equal weight of "treating solution" containing, in admixture with the water the appropriate or required amount of organic solvent, which may be for instance, denatured alcohol, the latter constituting say 40% of the "treating solution." During the treatment of the mass with such solution the temperature should not be allowed to rise to the point of decomposition of the cyanid. When the cyanid has been dissolved in the "treating solution" and the temperature has returned to normal the mass is filtered and thereafter the filtrate is evaporated to dryness under reduced pressure. The residue left after such evaporation constitutes commercially pure cyanid. For purposes of economy the alcohol which is driven off during the evaporation process may be collected in any suitable condensing apparatus. Although, as stated, I prefer to convert the carbonate from the anhydrous or monohydrate form to the decahydrate form before treating the furnaced mixture with the "treating solution," this is not necessary because good results are obtained by treating the mixture directly with such solution without first converting the carbonate to decahydrate form.

In commercial practice the residue left on the filter after the filtration process should be washed with an amount of "treating solution" sufficient to be used on the next batch of furnaced material to be treated. Such residue which, after such washing, is substantially free of cyanid contains nearly all of the carbonate and is wet with the said "treating solution." In order to remove the latter the said residue is subjected to a drying or steaming operation, the organic solvent constituent being condensed and collected. The dry residue may be mixed with the necessary ingredients and returned to the furnace for further treatment for conversion into cyanid.

I claim:—

1. The method of extracting alkali-metal cyanid from products containing the same, which comprises extracting such product with a composite solvent comprising water and an organic solvent retarding the hydrolytic decomposition of the cyanid by the water and maintaining the temperature of the mass during extraction below the point at which substantial decompositon of the cyanid occurs.

2. The method of extracting alkali-metal cyanid from products containing the same, in admixture with alkali-metal carbonate, which comprises extracting such product at a temperature precluding substantial decomposition of the cyanid with a composite solvent, comprising water and an organic solvent soluble therein, in which the cyanid is soluble and the carbonate relatively insoluble, and thereby recovering the cyanid relatively free from carbonate.

3. The method of extracting alkali-metal cyanid from products containing the same, in admixture with alkali-metal carbonate, which comprises extracting such product at a temperature precluding substantial decomposition of the cyanid with a composite solvent, made up of water and an alcohol, in which the cyanid is soluble and the carbonate relatively insoluble, and thereby recovering the cyanid relatively free from carbonate.

4. The method of extracting alkali-metal cyanid from furnace products containing the same in admixture with anhydrous alkali-metal carbonate, which comprises hydrating the product, and extracting the product after hydration with a solvent in which the cyanid is soluble and the hydrated carbonate relatively insoluble, and thereby recovering the cyanid relatively free from the hydrated carbonate.

5. The method of extracting sodium cyanid from furnace products containing the same in admixture with sodium carbonate, which comprises treating the product with water to convert the sodium carbonate into the form of the decahydrate, extracting the product with a solvent in which the cyanid is soluble and the hydrated carbonate relatively insoluble, and thereby recovering the cyanid relatively free from the hydrated carbonate.

6. The method of extracting sodium cyanid from furnace products containing the same in admixture with anhydrous sodium carbonate, which comprises hydrating the product to convert the carbonate into the decahydrate form, extracting the hydrated product with a composite solvent, comprising water and an organic solvent soluble therein, in which the cyanid is soluble and the carbonate relatively insoluble, and thereby recovering the cyanid relatively free from the hydrated carbonate.

7. The method of extracting alkali-metal cyanid from products containing the same, which comprises extracting a charge or batch of the product with a composite solvent comprising water and an organic solvent retarding the hydrolytic decomposition of the cyanid by the water, separating the solvent from the charge, washing the charge with a similar amount of fresh solvent, and extracting a fresh charge of the product with the washing solution thus employed.

8. The method of extracting alkali-metal cyanid from products containing the same, which comprises subjecting such product to extraction with a composite solvent comprising water and an organic solvent, separating the solvent maintaining the temperature of the mass during extraction below the point at which substantial decomposition of the cyanid occurs with its dissolved cyanid from the product, and recovering the remaining organic solvent from the product after the extraction.

9. The method of extracting alkali-metal cyanid from products containing the same, in admixture with alkali-metal carbonates, which comprises extracting such product at substantially room temperature with a composite solvent containing from 20 to 60% of alcohol and 80 to 40 parts of water, and thereby recovering the cyanid relatively free from carbonate.

10. The method of producing and extracting alkali-metal cyanid, which comprises subjecting a mixture of carbonaceous material and alkali carbonate to the action of nitrogen or a nitrogen-containing gas at a temperature appropriate to the formation of alkali-metal cyanid, extracting the resulting furnace product at substantially room temperature with a composite solvent comprising water and an organic solvent soluble therein, in which the cyanid is soluble and the alkali-metal carbonate present is relatively insoluble, and thereby recovering the cyanid relatively free from carbonate and leaving the carbonate mixed with the other constituents of the furnace product.

11. The method of producing and extracting sodium cyanid, which comprises subjecting a mixture of carbonaceous material and sodium carbonate to the action of nitrogen or a nitrogen-containing gas at a temperature appropriate to the formation of sodium cyanid, treating the furnace product with water to convert its anhydrous sodium carbonate into the decahydrate form, extracting the resulting product with a solvent, comprising water and an organic solvent soluble therein, in which sodium cyanid is soluble and the hydrated sodium carbonate relatively insoluble, and thereby recovering the sodium cyanid relatively free from carbonate, and leaving the sodium carbonate in the product.

12. The method of producing and extracting alkali-metal cyanid, which comprises subjecting a mixture of carbonaceous material and alkali carbonate to the action of nitrogen or a nitrogen-containing gas at a temperature appropriate to the formation of alkali-metal cyanid, extracting the resulting furnace product with a composite solvent comprising water and an organic solvent soluble therein, in which the cyanid is soluble and the alkali-metal carbonate present is relatively insoluble, and thereby recovering the cyanid relatively free from carbonate and leaving the carbonate admixed with the other constituents of the furnace product, mixing with the extracted residue the necessary ingredients, and returning the same to the cyanid furnace for further production of cyanid therefrom.

13. The method of producing and extracting sodium cyanid, which comprises subjecting a mixture of carbonaceous material and sodium carbonate to the action of nitrogen or a nitrogen-containing gas at a temperature appropriate to the formation of sodium cyanid, treating the furnace product with water to convert its anhydrous sodium carbonate into the decahydrate form, extracting the resulting product with a solvent comprising water and an organic solvent soluble therein, in which sodium cyanid is soluble and the hydrated sodium carbonate relatively insoluble, and thereby recovering the sodium cyanid relatively free from carbonate, and leaving the sodium carbonate in the product, mixing with the extracted residue the necessary ingredients, and returning the same to the cyanid furnace for further production of cyanid therefrom.

14. The method of producing and extracting alkali-metal cyanid, which comprises subjecting a mixture of alkali-metal carbonate and carbonaceous material to the action of nitrogen or a nitrogen-containing gas at a temperature appropriate to the formation of alkali-metal cyanid, extracting the cyanid formed without extraction of any substantial amount of the unconverted alkali-metal carbonate, and thereby obtaining the cyanid relatively free from carbonate and leaving the carbonate in the extracted residue, mixing with the extracted residue the necessary ingredients, and returning the same to the cyanid furnace for the production of further amounts of cyanid therefrom.

In testimony that I claim the foregoing as my invention, I have hereunto signed my name this 23rd day of July, A. D., 1917.

FLOYD J. METZGER.